(12) United States Patent
Nishi (10) Patent No.: US 7,558,091 B2
(45) Date of Patent: Jul. 7, 2009

(54) SWITCHING POWER SUPPLY APPARATUS

(75) Inventor: Haruo Nishi, Goze (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 27 days.

(21) Appl. No.: 11/954,879

(22) Filed: Dec. 12, 2007

(65) Prior Publication Data

US 2008/0165552 A1 Jul. 10, 2008

(30) Foreign Application Priority Data

Dec. 14, 2006 (JP) .............................. 2006-337409

(51) Int. Cl.
*H02H 7/122* (2006.01)
(52) U.S. Cl. ...................... 363/56.09; 363/37; 363/56.1
(58) Field of Classification Search .............. 363/21.01, 363/21.02, 56.01, 56.09, 56.1, 56.11, 56.12, 363/37, 45, 47
See application file for complete search history.

(56) References Cited

U.S. PATENT DOCUMENTS

| 5,883,794 | A | * | 3/1999 | Takahashi et al. | ......... 363/21.02 |
| 6,344,982 | B1 | * | 2/2002 | Morimoto et al. | ......... 363/56.09 |
| 6,384,579 | B2 | * | 5/2002 | Watanabe | .................... 320/166 |

FOREIGN PATENT DOCUMENTS

JP 2003-153529 A 5/2003

* cited by examiner

*Primary Examiner*—Jessica Han
(74) *Attorney, Agent, or Firm*—Birch, Stewart, Kolasch & Birch, LLP (57) ABSTRACT

The switching power supply apparatus includes detection means for detecting that leak current of an input smoothing capacitor becomes a predetermined value or more and first auxiliary switching means connected in series with respect to the input smoothing capacitor. The first auxiliary switching means becomes an on state during a normal operation, whereas the first auxiliary switching means goes into an off state in a case where the detection means detects that the leak current of the input smoothing capacitor becomes a predetermined value or more.

22 Claims, 8 Drawing Sheets

SWITCHING POWER SUPPLY APPARATUS

This Nonprovisional application claims priority under 35 U.S.C. § 119(a) on Patent Application No. 337409/2006 filed in Japan on Dec. 14, 2006, the entire contents of which are hereby incorporated by reference.

FIELD OF THE INVENTION

The present invention relates to a switching power supply apparatus that is used in an AC-DC converter or a DC-DC converter and outputs a stable DC voltage.

BACKGROUND OF THE INVENTION

Conventionally, a switching power supply apparatus is widely applied in various electronic apparatuses such as copying machines, printers, facsimiles, AV (Audio-Visual) equipment, liquid crystal televisions, plasma display panels, and communication terminals. Such a switching power supply apparatus switches, at a high frequency, a DC voltage obtained by rectifying/smoothing commercial AC power supply and converts the switched DC voltage to a desired voltage at a high efficiency with the use of a small-size transformer.

The switching power supply apparatus having a typical arrangement includes a PWM (Pulse Width Modulation) switching power supply apparatus. The PWM switching power supply apparatus includes a main switching element that switches a DC voltage to be applied to a primary side of a transformer. In the arrangement of the PWM switching power supply apparatus, a desired output voltage on a secondary side of a transformer is obtained by detecting the output voltage on the secondary side of the transformer with the use of a voltage detection circuit and controlling with a control circuit a switching pulse width of the main switching element in accordance with a result of the detection.

Figure 7:
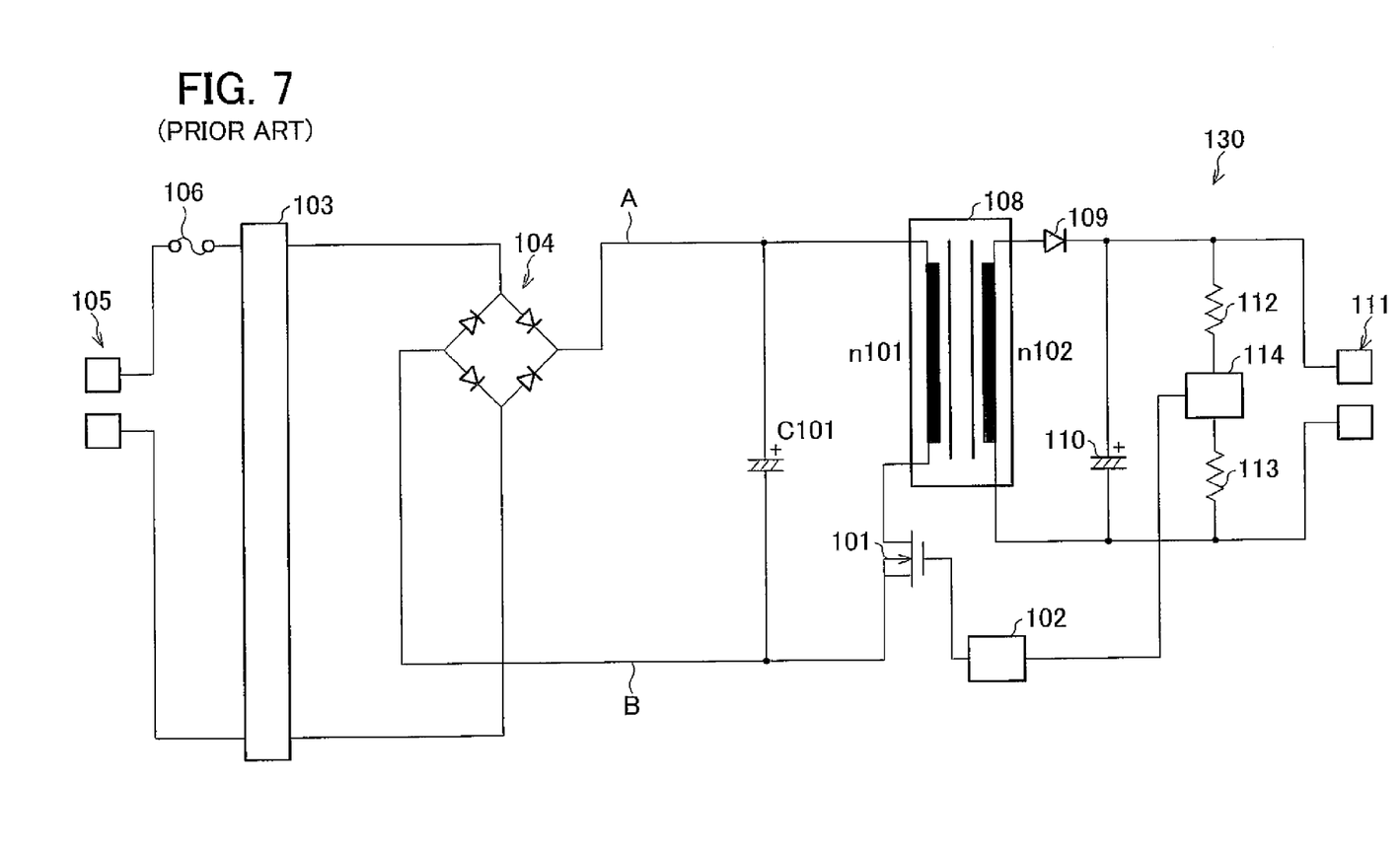
FIG. 7 is a circuit diagram of a conventional switching power supply apparatus.

FIG. 7 is a circuit diagram illustrating an arrangement of a conventional typical switching power supply apparatus 130. As illustrated in FIG. 7, the switching power supply apparatus 130 includes an input terminal 105, a fuse 106, a filter circuit 103, a bridge diode 104, an input smoothing capacitor C101, a transformer 108, a main switching element 101, a diode 109, an output smoothing capacitor 110, voltage divider resistors 112 and 113, a comparator circuit 114, a control circuit 102, and an output terminal 111.

An AC voltage inputted into the input terminal 105 from a commercial power source is rectified by the bridge diode 104 and the input smoothing capacitor C101 after noise components of the AC voltage is removed by the filter circuit 103. A DC voltage obtained by this rectification is inputted between a high-level power supply line A and a low-level power supply line B.

A series circuit composed of a primary coil n101 of the transformer 108 and the main switching element 101 is connected between the power supply lines A and B. The main switching element 101 is on/off controlled by the control circuit 102.

When the main switching element 101 is turned on, an exciting energy is stored in the primary coil n101.

When the main switching element 101 is turned off, this exciting energy is induced to a secondary coil n102 of the transformer 108. The exciting energy is, then, outputted via the output terminal 111, after smoothed by the diode 109 and the output smoothing capacitor 110.

The output voltage of the output terminal 111 is divided by the voltage divider resistors 112 and 113 and inputted into the comparator circuit 114. The comparator circuit 114 compares a value of a divided voltage of the output voltage with a reference voltage, and feeds back a result of the comparison to the control circuit 102.

The control circuit 102 controls switching of the main switching element 101 (carries out PWM control) based on the result of the comparison inputted from the comparator circuit 114 so that the output voltage of the switching power supply apparatus 130 becomes constant.

Further, the switching power supply apparatus 130 includes the fuse (overcurrent prevention means) 106 connected between one end of the input terminal 105 and the filter circuit 103. When a current of a predetermined amount or more flows, the fuse 106 blows and disconnects the switching power supply apparatus 130 from the commercial power source.

Japanese Unexamined Patent Publication No. 153529/2003 (Tokukai 2003-153529 (published on May 23, 2003)) discloses a technique to stop a switching power supply circuit by providing the switching power supply circuit with a low voltage detection circuit detecting an output voltage to be applied to a load that is connected to a secondary side of a transformer and shutting off feedback from the secondary side to a primary side of the transformer at the time when the low voltage detection circuit finds that the output voltage is decreased to a predetermined value or less.

Various safety standards are defined with respect to electronics devices. Examples of such safety standards are Standard IEC (International Electrotechnical Commission) that is a worldwide safety standard, Standard UL (Underwriters Laboratories Inc.) (US), Standard CSA (Canadian Standards Association) (Canada), and Standard BS (British Standards Institution) (England). Moreover, Electrical Appliance And Material Safety Law is enforced in Japan since Apr. 1, 2001.

In case of Japan, for example, an open/short test is carried out when electrical appliances and materials are certified to the safety standard. Assuming phenomena such as contact with a foreign material, improper wiring processing, and defect in soldering which possibly occur in electronics devices, the open/short test is arranged to check that an unsafe state such as smoking or firing does not occur in a case where (i) ends or terminals of a component is short-circuited and (ii) one end of a component becomes open.

However, even if an electronics device including the conventional switching power supply apparatus complies with the safety standard in production and shipping stages of the electronics device, the conventional switching power supply apparatus had a following problem. That is, when the input smoothing capacitor C101 deteriorates and an insulating resistance decreases, a leak current flowing in the input smoothing capacitor C101 increases (so-called, half short circuit). This causes overheat of the bridge diode 104 and the filter circuit 103 before the fuse 106 blows due to the increase.

Namely, even if the switching power supply apparatus 130 complies with a standard defined by the safety standard at the time of production and shipment, the input smoothing capacitor C101 may deteriorate and the insulating resistance may decrease in a case where the switching power supply apparatus 130 is used after expiration of a warranty period or under an improper condition. When, consequently, the leak current of the input smoothing capacitor C101 increases, there is a time lug between time when the leak current starts to increase and time when the fuse 106 blows. Accordingly, before the fuse 106 blows, an overcurrent may flow into the bridge diode 104 and the filter circuit 103 provided in a preceding stage with respect to the input smoothing capacitor C101. This may overheat the bridge diode 104 and the filter circuit 103. Further, the fuse 106 does not blow, when a value of the current flowing in the fuse 106 does not reach a level for blowing the fuse 106 after the increase of the leak current of the smoothing capacitor C101. As a result, the bridge diode 104 and the filter circuit 103 may overheat.

According to a technique disclosed in Japanese Unexamined Patent Publication No. 153529/2003 (Tokukai 2003-153529 (published on May 23, 2003)), it takes a long time before the switching power supply circuit stops, after a half short circuit occurs. This may cause an overcurrent to flow in a circuit provided in the preceding stage with respect to the input smoothing capacitor C101, before the switching power supply circuit stops. As a result, the circuit may overheat. Namely, according to the technique disclosed in Japanese Unexamined Patent Publication No. 153529/2003 (Tokukai 2003-153529 (published on May 23, 2003)), it takes a long time before it is detected that the output voltage decreases to a predetermined value or less due to a half short circuit, after the half short circuit occurs. Moreover, it takes a long time before the switching power supply circuit is stopped by shutting off feedback from a secondary side of a transformer to a primary side thereof, after it is detected that the output voltage becomes equal to or less than the predetermined value. As a result, an overcurrent flows into the circuit provided in the preceding stage with respect to the input smoothing capacitor C101 before the switching power supply circuit is stopped, after the half short circuit occurs.

SUMMARY OF THE INVENTION

The present invention is attained in view of the problems mentioned above. An object of the present invention is to provide a switching power supply apparatus that can prevent, with a simple circuit configuration, overheat due to an increased leak current of an input smoothing capacitor.

In order to achieve the object mentioned above, a first switching power supply apparatus of the present invention includes: a transformer including a primary coil and a secondary coil; an input smoothing capacitor that is connected in parallel to the primary coil and smoothes a DC voltage to be inputted into the primary coil; main switching means causing, by switching the DC voltage, the DC voltage to be outputted to the secondary coil as a pulse; output means that smoothes and outputs the pulse; control means for controlling a switching operation of the main switching means so that an output voltage from the output means becomes constant; detection means for detecting that leak current of the input smoothing capacitor becomes equal to or more than a predetermined value; and first auxiliary switching means connected in series with respect to the input smoothing capacitor, the first auxiliary switching means being in an on state during a normal operation, whereas the first auxiliary switching means goes into an off state when the detection means detects that the leak current of the input smoothing capacitor becomes equal to or more than the predetermined value.

According to the arrangement, the switching power supply apparatus includes: the detection means for detecting that the leak current of the input smoothing capacitor becomes equal to or more than the predetermined value, and the first auxiliary switching means connected in series with respect to the input smoothing capacitor. The first auxiliary switching means becomes the on state during a normal operation (when a value of the leak current is less than the predetermined value). Accordingly, a voltage is applied to the input smoothing capacitor, and the input smoothing capacitor can smooth the voltage applied. Meanwhile, when the detection means detects that the leak current of the input smoothing capacitor becomes equal to or more than the predetermined value, the first auxiliary switching means becomes the off state. This shuts off the voltage to be applied to the input smoothing capacitor and properly prevents, with a simple circuit configuration, the switching power supply apparatus from going into an unstable state due to the leak current of the input smoothing capacitor.

A second switching power supply apparatus of the present invention, in order to solve achieve the object mentioned above, includes: an input section including a first terminal and a second terminal and being connected to a voltage supply source; overcurrent shutting off means connected to the first terminal; a transformer including a primary coil and a secondary coil; an input smoothing capacitor that is connected in parallel to the primary coil and smoothes a DC voltage to be inputted into the primary coil; main switching means causing, by switching the DC voltage, the DC voltage to be outputted to the secondary coil as a pulse; output means that smoothes and outputs the pulse; control means for controlling a switching operation of the main switching means so that an output voltage from the output means becomes constant; detection means for detecting that leak current of the input smoothing capacitor becomes equal to or more than a predetermined value; and second auxiliary switching means connected in parallel with respect to the input smoothing capacitor, the second auxiliary switching means being in an off state during a normal operation, whereas the second auxiliary switching means goes into an on state when the detection means detects that the leak current of the input smoothing capacitor becomes equal to or more than the predetermined value.

According to the arrangement, the second switching power source apparatus of the present invention includes: the input section that has the first terminal and the second terminal and is connected to the voltage power source; and the overcurrent shutting off means connected between (a) a node of the input smoothing capacitor and the primary coil and (b) the first terminal; and the second auxiliary switching means connected in parallel to the input smoothing capacitor. The secondary auxiliary switching means is turned off during a normal operation. Accordingly, the second auxiliary switching means does not contribute to the switching operation of the switching power supply apparatus. Meanwhile, when the detection means detects that the leak current of the input smoothing capacitor becomes equal to or more than the predetermined value, the second auxiliary switching means becomes the on state. This causes a current to flow into the overcurrent shutting off means via the second auxiliary switching means and increases a current flowing in the overcurrent shutting off means. Therefore, it becomes possible to shut off the current flowing in the switching power supply apparatus by causing the overcurrent shutting off means to quickly operate. This makes it possible to properly prevent, with a simple circuit configuration, the switching power supply apparatus from going into an unstable state due to the leak current of the input smoothing capacitor.

A third switching power supply apparatus of the present invention includes: an input section including a first terminal and a second terminal and being connected to an AC voltage supply source; overcurrent shutting off means connected to the first terminal; filter means connected to the overcurrent shutting off means and the second terminal; rectifying means for rectifying an AC voltage inputted into the input section; a transformer including a primary coil and a secondary coil; an input smoothing capacitor that is connected in parallel to the primary coil and smoothes a DC voltage to be inputted into the primary coil; main switching means causing, by switching the DC voltage, the DC voltage to be outputted to the secondary coil as a pulse; output means that smoothes and outputs the pulse; control means for controlling a switching operation of the main switching means so that an output voltage from the output means becomes constant; detection means for detecting that leak current of the input smoothing capacitor becomes equal to or more than a predetermined value; and third auxiliary switching means connected in parallel to the filter means, the third auxiliary switching means being in an off state during a normal operation, whereas the third auxiliary switching means goes into an on state when the detection means detects that the leak current of the input smoothing capacitor becomes equal to or more than the predetermined value.

According to the arrangement, the third switching power supply apparatus of the present invention includes: the input section that has the first terminal and the second terminal and is connected to the AC voltage power source; the overcurrent shutting off means connected to the first terminal; the filter means connected to the overcurrent shutting off means and the second terminal; the rectifying means for rectifying the AC voltage inputted into the input section; and the third auxiliary switching means connected in parallel to the filter means. The third auxiliary switching means is turned off during a normal operation. Accordingly, the third auxiliary switching means does not contribute to the switching operation of the switching power supply apparatus. Meanwhile, when the detection means detects that the leak current of the input smoothing capacitor becomes equal to or more than the predetermined value, the third auxiliary switching means becomes the on state. This causes a current to flow into the filter means via the third auxiliary switching means and the filter means is short-circuited. This increases a current flowing in the overcurrent shutting off means. Therefore, it becomes possible to shut off the current flowing into the switching power supply apparatus by causing the overcurrent shutting off means to quickly operate. This makes it possible to properly prevent, with a simple circuit configuration, the switching power supply apparatus from going into an unstable state due to the leak current of the input smoothing capacitor.

For a fuller understanding of the nature and advantages of the invention, reference should be made to the ensuing detailed description taken in conjunction with the accompanying drawings.

DESCRIPTION OF THE EMBODIMENTS

Embodiment 1

Figure 1:
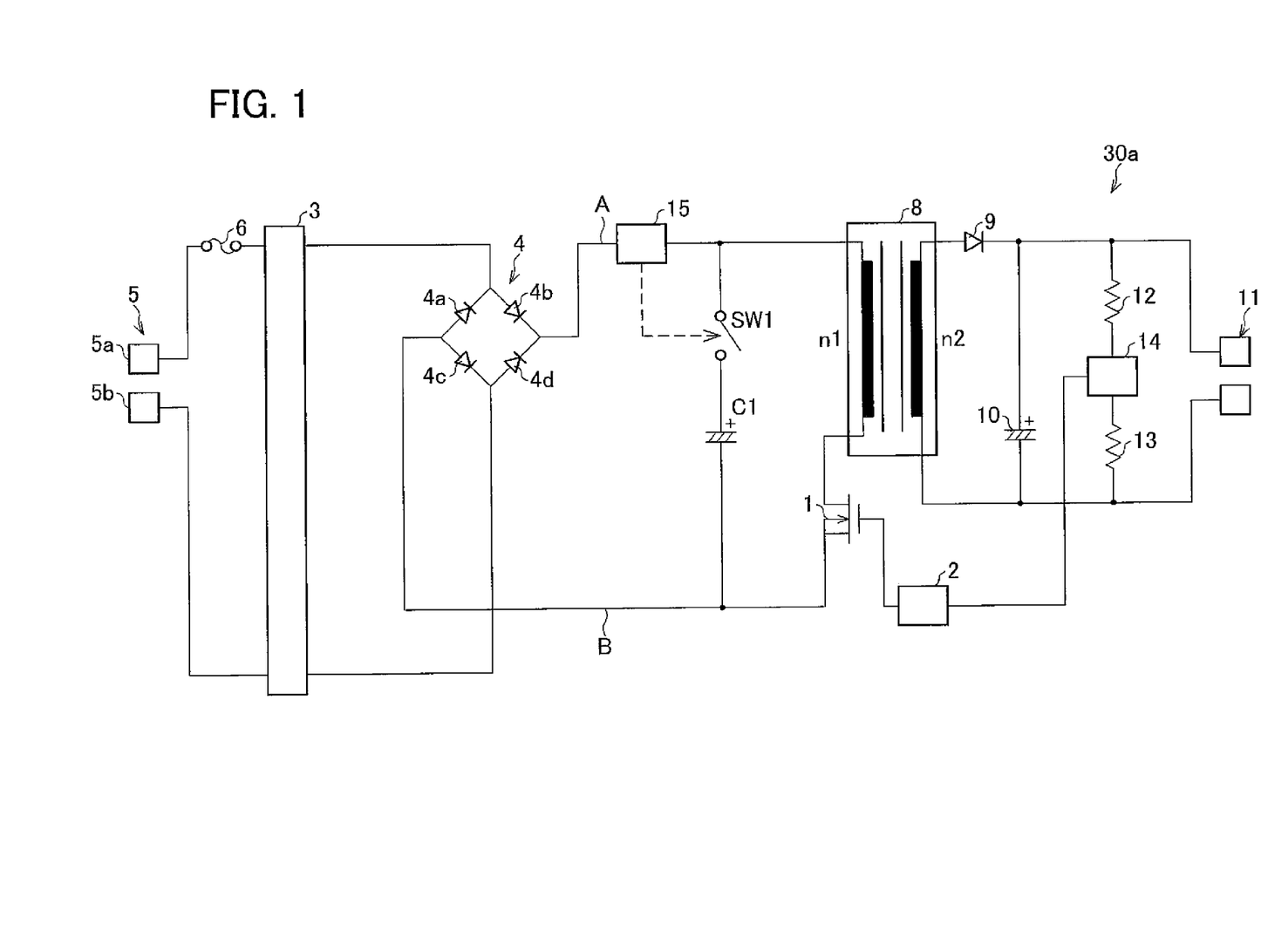
FIG. 1 is a circuit diagram of a switching power supply apparatus according to an exemplary embodiment of the present invention.

On an exemplary embodiment of the present invention is explained below. FIG. 1 is a circuit diagram schematically illustrating a configuration of a switching power supply apparatus 30a of the present embodiment. As illustrated in FIG. 1, the switching power supply apparatus 30a includes an input section 5, a fuse 6, a filter circuit 3, a bridge diode 4, a ripple voltage detection circuit 15, a switching element SW1, an input smoothing capacitor C1, a transformer 8, a main switching element 1, a diode 9, an output smoothing capacitor 10, voltage divider resistors 12 and 13, a comparator circuit 14, a control circuit 2, and an output terminal 11.

The input section 5 includes a first terminal 5a and a second terminal 5b. These terminals 5a and 5b are connected to a commercial power source (not shown). An AC voltage (for example, AC 100V) is applied to the terminals 5a and 5b.

Figure 8:
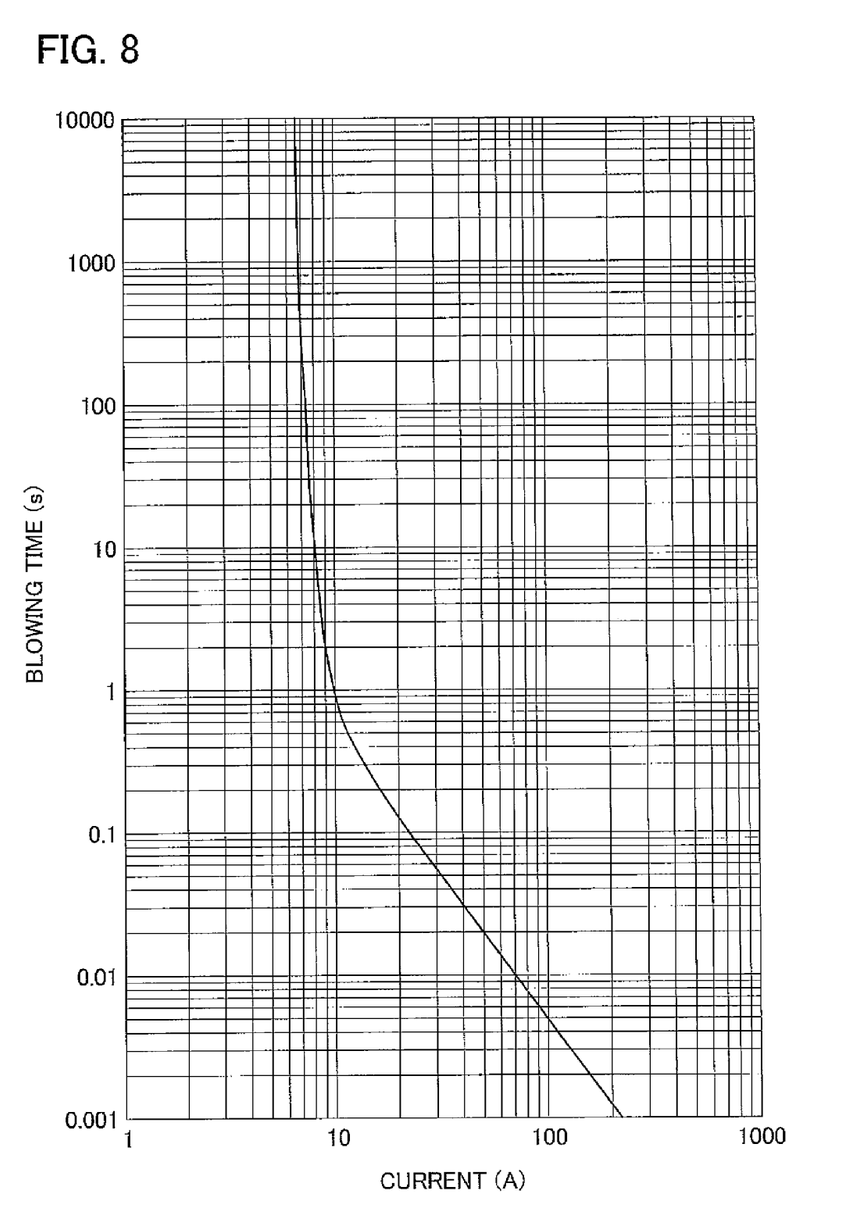
FIG. 8 is a graph showing a relationship between a current flowing in a fuse provided in the switching power supply apparatus according to the exemplary embodiment of the present invention and a time it takes a fuse to blow.

The fuse (overcurrent shutting off means) 6 is provided between the input terminal 5a of the input section 5 and one input terminal of the filter circuit 3. The fuse 6 blows when a current of a predetermined amount or more flows into the fuse 6, and shuts off power supply to the switching power supply apparatus 30a. In the present embodiment, a fuse with 5A rated current (produced by Littelfuse Inc., Part Number: 237005) is used as the fuse 6. FIG. 8 is a graph showing a relationship between a current flowing in the fuse 6 and a time it takes for blowing the fuse 6. As illustrated in FIG. 8, the fuse 6 does not blow when the rated current (5A) flows for 100000 seconds or more. However, the fuse 6 takes approximately one second to blow, after a current (10A) that is twice as much as the rated current flows in the fuse 6.

The filter circuit (filter means) 3 has one input terminal connected to the fuse 6 and the other input terminal connected to the second terminal 5b of the input section 5. The filter circuit 3 removes noise components from an AC voltage inputted.

The bridge diode (rectifying means) 4 is a bridge circuit composed of four diodes 4a through 4d. A cathode of the diode 4a and an anode of the diode 4b are connected together to one output terminal of the filter circuit 3. A cathode of the diode 4c and an anode of the diode 4d are connected together to the other output terminal of the filter circuit 3. An anode of the diode 4a and an anode of the diode 4c are connected together to a low-level power supply line B. A cathode of the diode 4b and a cathode of the diode 4d are connected together to a high-level power supply line A. The bridge diode 4 carries out full wave rectification with respect to an AC voltage inputted from the filter circuit 3 and outputs a pulsing voltage between the low-level power supply line B and the high-level power supply line A.

The ripple voltage detection circuit (detection means) 15 detects a ripple voltage (AC component in a DC voltage output) that occurs in the input smoothing capacitor C1 when a half short circuit of the input smoothing capacitor C1 occurs (leak current of the input smoothing capacitor C1 increases). The ripple voltage detection circuit 15 also controls opening/closing of the switching element SW1 in accordance with a result of the detection and is connected in series to the high-level power supply line A. More specifically, the ripple voltage detection circuit 15 is connected in series between (a) a node of a series circuit composed of the input smoothing capacitor C1 and the switching element SW1 and a series circuit composed of the primary coil n1 of the transformer 8 and the main switching element 1 and (b) the bridge diode 4.

The power supply lines A and B are connected via a series circuit composed of the input smoothing capacitor C1 and the switching element (first auxiliary switching means) SW1. The configuration of the switching element SW1 is not specifically limited. The switching element SW1 may have any configuration as long as the switching element SW1 can switch between an on state and an off state according to a control signal supplied by the ripple voltage detection circuit 15.

The input smoothing capacitor C1 smoothes the pulsing voltage outputted from the bridge diode 4. In other words, rectification is carried out with respect to an AC voltage inputted from a main power supply circuit composed of the bridge diode 4 and the input smoothing capacitor C1. Then, a DC voltage obtained by the rectification is inputted between the high-level power supply line A and the low-level poser supply line B.

The series circuit composed of the main switching element 1 and the primary coil n1 of the transformer 8 is connected between the power supply lines A and B. Namely, the series circuit composed of the input smoothing capacitor C1 and the switching element SW1 is connected in parallel with the series circuit composed of the main switching element 1 and the primary coil n1 of the transformer 8, between the power supply lines A and B.

The main switching element (main switching means) 1 that is on/off controlled by the control circuit 2 switches a DC voltage to be applied to the primary coil n1 of the transformer 8 and causes the DC voltage to be outputted as a pulse to the primary coil n2. In the present embodiment, an N-channel field effect transistor (FET) is used as the main switching element 1. However, the main switching element 1 is not limited to this as long as the main switching element 1 has a switching function. For example, the main switching element may be a P-channel FET or a switching element of another type such as a bipolar transistor.

One end of the secondary coil n2 of the transformer 8 is connected to an anode of the diode 9. A cathode of the diode 9 is connected to the other end of the secondary coil n2 via the output smoothing capacitor C2. Moreover, the cathode of the diode 9 is connected to the other end of the secondary coil n2 via the voltage divider resistor 12, the comparator circuit 14, and the voltage divider resistor 13. Further, the cathode of the diode 9 is connected to one end of the output terminal 11 and the other end of the secondary coil n2 is connected to the other end of the output terminal 11.

In the switching power supply apparatus 30a having the arrangement as mentioned above, an exciting energy is stored in the primary coil n1 when the main switching element 1 is turned on during a normal operation (a state where a value of leak current is less than a predetermined value, a state in which the switching element SW1 is turned on in the present embodiment). This exciting energy is induced to a side provided with the secondary coil n2 when the main switching element 1 is turned off. Smoothed by the output means composed of the diode 9 and the output smoothing capacitor C10, the exciting energy is outputted via the output terminal 11.

Moreover, the output voltage of the output terminal 11 is divided by the voltage divider resistors 12 and 13, and inputted into the comparator circuit 14. The comparator circuit 14 compares a value of a divided voltage of the output voltage with a value of a reference voltage, and feeds back a result of the comparison to the control circuit 2.

The control circuit (control means) 2 generates a drive signal (gate voltage) of the main switching element 1 in accordance with the result of the comparison so that the output voltage of the switching power supply apparatus 30a has a constant value. Then, the control circuit 2 supplies the drive signal to a gate of the main switching element 1 and controls (carries out PWM control on) switching of the main switching element 1. This allows the switching power supply apparatus 30a to output a stable DC voltage.

Next explained is an operation in a case where a half short circuit of the input smoothing capacitor C1 occurs (leak current of the input smoothing capacitor C1 increases).

The ripple voltage detection circuit 15 monitors the occurrence of a ripple voltage (an AC component in the DC voltage output) in the input smoothing capacitor C1 which ripple voltage accompanies the occurrence of the half short circuit. The ripple voltage detection circuit 15 may detect that the input smoothing capacitor C1 is half short-circuited, by detecting that a range of a change in a potential of the power supply line A becomes larger than a predetermined value or more.

When a ripple voltage is detected, the ripple voltage detection circuit 15 turns off the switching element SW1. This shuts off a current supply (voltage supply) to the input smoothing capacitor C1 that is half short-circuited, and appropriately prevents, with a simple circuit configuration, the switching power supply apparatus 30a from going into an unsafe sate due to the leak current of the input smoothing capacitor C1.

Embodiment 2

Another exemplary embodiment of the present invention is explained below. For convenience of an explanation, members given the same reference numerals as the members as in the Embodiment 1 respectively have identical functions, and the explanations thereof are omitted.

Figure 2:
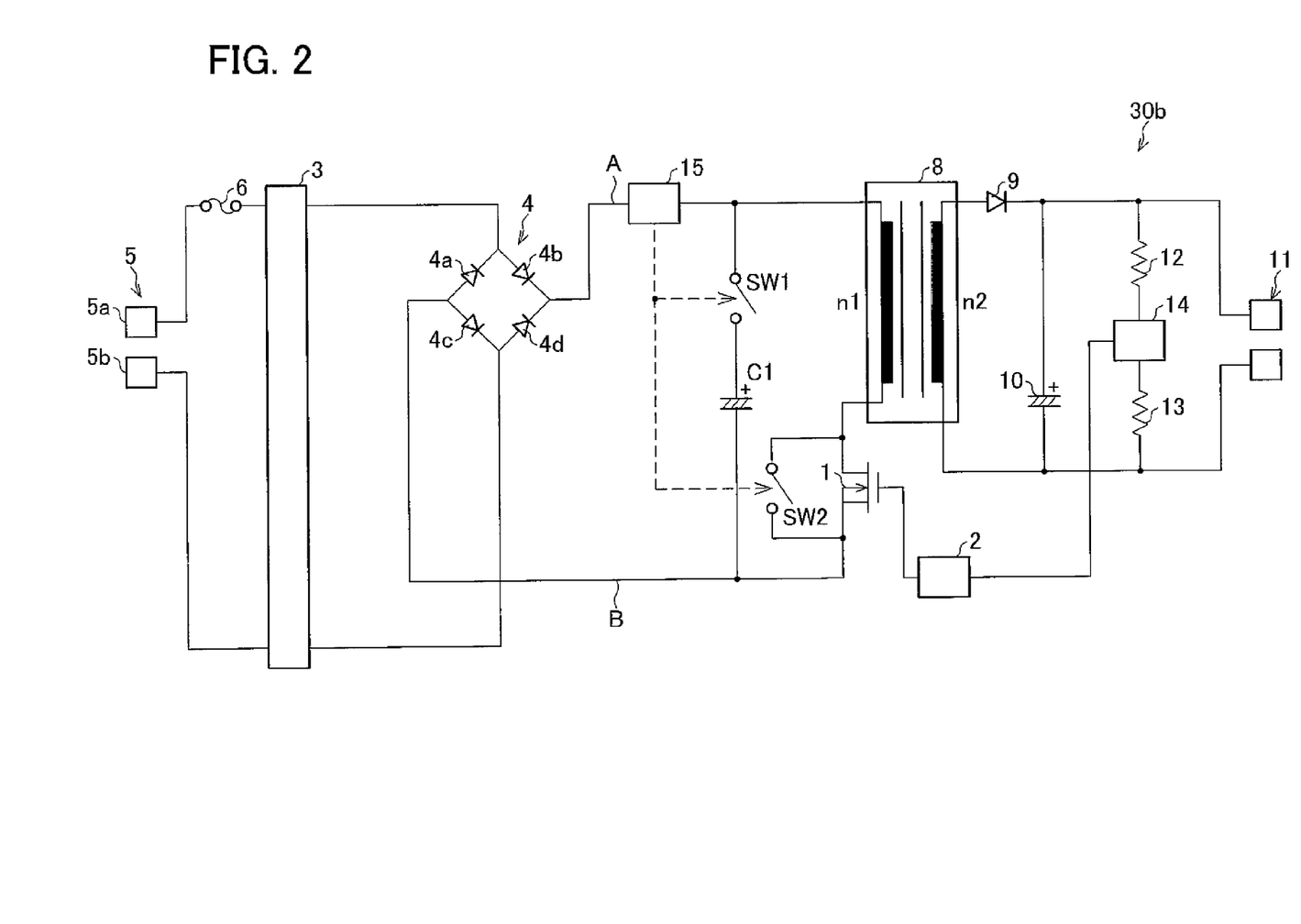
FIG. 2 is a circuit diagram of a switching power supply apparatus according to another exemplary embodiment of the present invention.

FIG. 2 is a circuit diagram schematically illustrating a configuration of a switching power supply apparatus 30b of the present embodiment. As illustrated in FIG. 2, the switching power supply apparatus 30b includes a switching element (second auxiliary switching means) SW2 connected in parallel with a main switching element 1. Namely, a series circuit including (i) a parallel circuit composed of the main switching element 1 and the switching element SW2 and (ii) a primary coil n1 of a transformer 8 is connected between the power supply lines A and B. A configuration of the switching element SW2 is not specifically limited as long as the switching element SW2 can switch between an on state and an off state according to a control signal supplied from a ripple voltage detection circuit 15.

The switching element SW2 is turned off during a normal operation (a state in which a value of leak current is less than a predetermined value). When the ripple voltage detection circuit 15 detects a ripple voltage, the state of the switching element SW2 is switched to the on state according to the control signal supplied from the ripple voltage detection circuit 15. This causes a short circuit between a drain and a source of the main switching element 1 provided in a subsequent stage with respect to the input smoothing capacitor C1. Consequently, a current of a rated current of a fuse 6 or more (for example, current that is twice as much as the rated current) flows into the fuse 6. This makes it possible to blow the fuse 6 immediately and stop the operation of the switching power supply apparatus 30b quickly. As a result, it becomes possible to prevent, with a simple circuit configuration, overheat due to a half short circuit of the input smoothing capacitor C1.

In the present embodiment, a configuration including the switching element SW1 and the switching element SW2 is explained. However, the configuration is not limited to this. For example, a configuration may not include the switching element SW1.

Embodiment 3

A still another exemplary embodiment of the present invention is explained below. For convenience of an explanation, members given the same reference numerals as the members as in the Embodiment 1 respectively have identical functions, and the explanations thereof are omitted.

Figure 3:
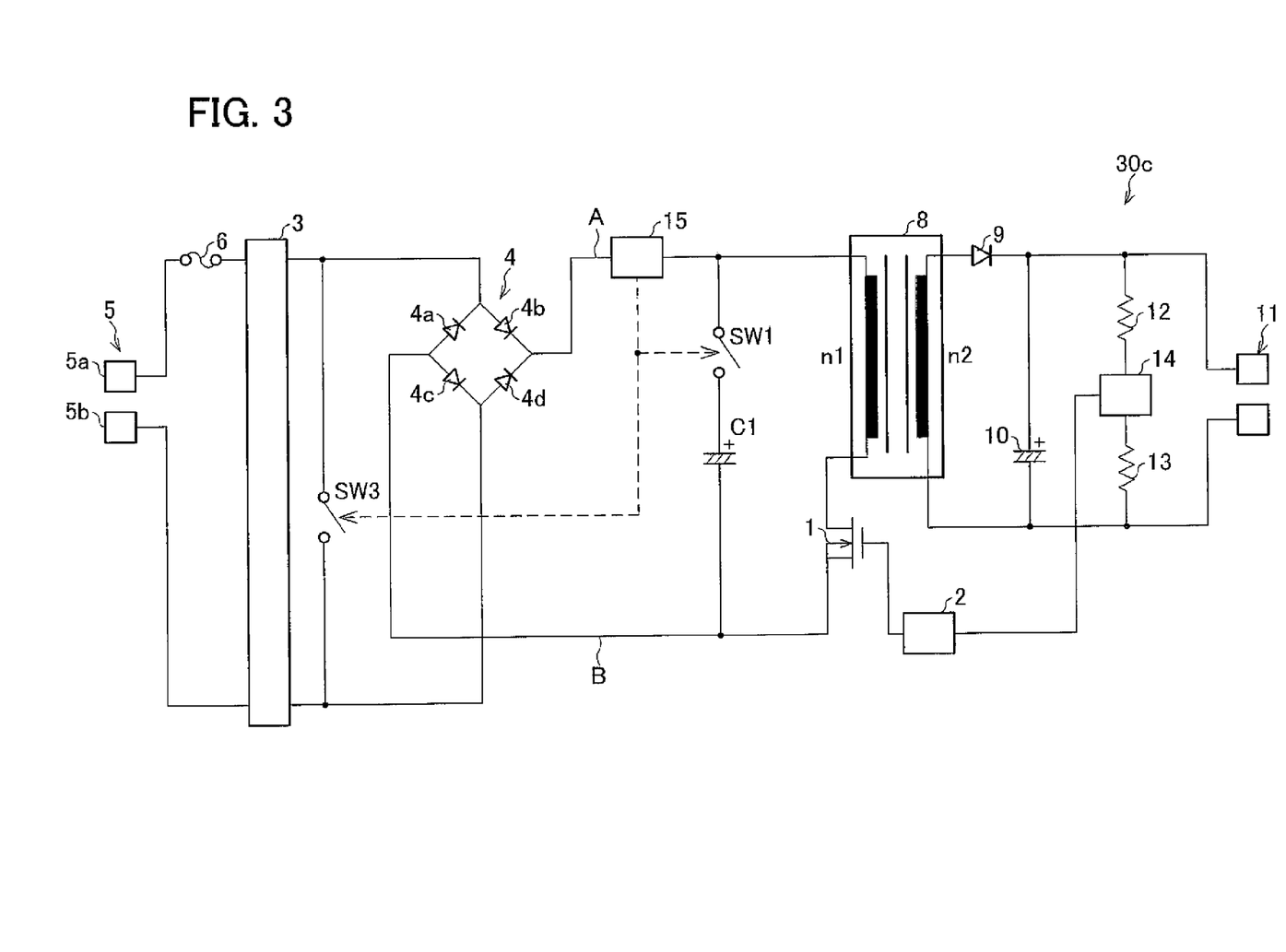
FIG. 3 is a circuit diagram of a switching power supply apparatus according to still another exemplary embodiment of the present invention.

FIG. 3 is a circuit diagram schematically illustrating a configuration of a switching power supply apparatus 30c according to the present embodiment. As illustrated in FIG. 3, the switching power supply apparatus 30c includes a switching element (third auxiliary switching element) SW3 connected between output terminals of a filter circuit 3, namely, the switching element SW3 connected in parallel with the filter circuit 3, in addition to a configuration of a switching power supply apparatus 30a as illustrated in the Embodiment 1. The configuration of the switching element SW3 is not specifically limited as long as the switching element SW3 can switch between an on state and an off state according to a control signal supplied from a ripple voltage detection circuit 15.

The switching element SW3 is turned off during a normal operation (a state in which a value of leak current is less than a predetermined value). When the ripple voltage detection circuit 15 detects a ripple voltage, the state of the switching element SW3 is switched to the on state according to a control signal supplied from the ripple voltage detection circuit 15. This shorts a preceding stage (a filter circuit 3 and the like provided in a preceding stage with respect to the input smoothing capacitor C1) of an input smoothing capacitor C1. Consequently, a current of a rated current of a fuse 6 or more (for example, current that is twice as much as the rated current) flows into the fuse 6. This makes it possible to blow the fuse 6 immediately and stop the operation of the switching power supply apparatus 30c quickly. As a result, it becomes possible, with a simple circuit configuration, to prevent overheat due to a half short circuit of the input smoothing capacitor C1.

In the present embodiment, a configuration including the switching element SW1 and the switching element SW3 is explained. However, the configuration is not limited to this. For example, a configuration may not include the switching element SW1. Alternatively, the configuration may include a switching element SW2 as explained in the Embodiment 2 in addition to the switching elements SW1 and SW3.

Embodiment 4

A still another exemplary embodiment of the present invention is explained below. For convenience of an explanation, members given the same reference numerals as the members as in the Embodiment 1 respectively have identical functions, and the explanations thereof are omitted.

Figure 4:
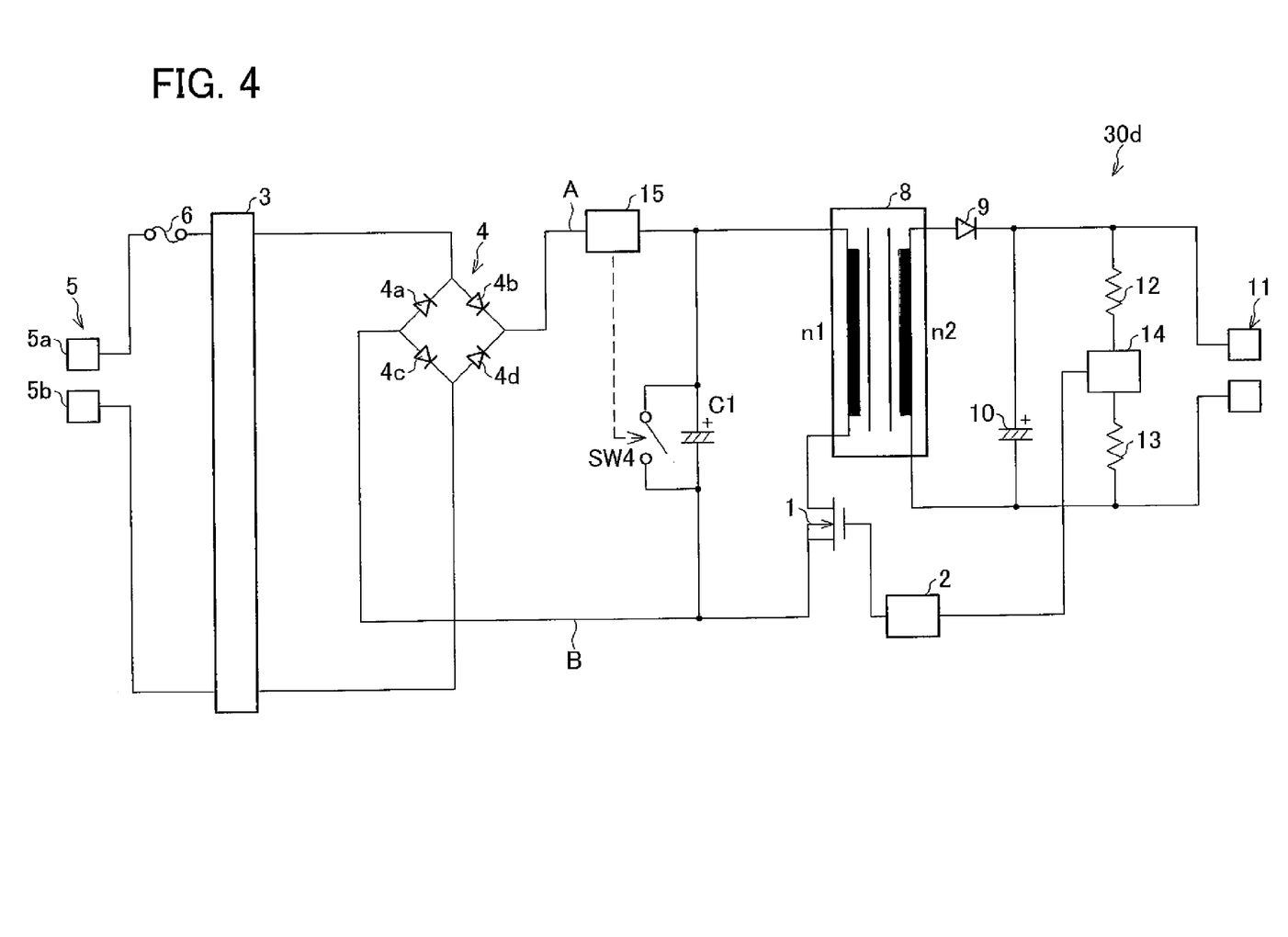
FIG. 4 is a circuit diagram of a switching power supply apparatus according to still another exemplary embodiment of the present invention.

FIG. 4 is a circuit diagram schematically illustrating a configuration of a switching power supply apparatus 30d according to the present embodiment. As illustrated in FIG. 4, the switching power supply apparatus 30d includes a switching element (fourth auxiliary switching element) SW4, in lieu of a switching element SW1, which switching element SW4 is connected in parallel with the input smoothing capacitor C1. In other words, in the switching power supply apparatus 30d of the present embodiment, a parallel circuit composed of the input smoothing capacitor C1 and the switching element SW4 is connected between the power supply lines A and B, whereas, in the switching power supply apparatus 30a, a series circuit composed of the input smoothing capacitor C1 and the switching element SW1 is connected between the power supply lines A and B. the configuration of the switching element SW4 is not specifically limited as long as the switching element SW4 can switch between an on state and an off state according to a control signal supplied from a ripple voltage detection circuit 15.

The switching element SW4 is turned off during a normal operation (a state in which a value of leak current is less than a predetermined value). When the ripple voltage detection circuit 15 detects a ripple voltage, the state of the switching element SW4 is switched to the on state according to a control signal supplied from the ripple voltage detection circuit 15. This shorts the input smoothing capacitor C1 (between power supply lines A and B). Consequently, a current of a rated current of a fuse 6 or more (for example, current that is twice as much as the rated current) flows into the fuse 6. This makes it possible to blow the fuse 6 immediately and stop the operation of the switching power supply apparatus 30d quickly. As a result, it becomes possible to prevent, with a simple circuit configuration, overheat due to a half short circuit of the input smoothing capacitor C1.

In the present embodiment, a configuration including the switching element SW4 is explained. However, the configuration is not limited to this. For example, a configuration may include both or one of switching elements SW2 and SW3, in addition to the switching element SW4.

Embodiment 5

A still another exemplary embodiment of the present invention is explained below. For convenience of an explanation, members given the same reference numerals as the members as in the Embodiment 1 respectively have identical functions, and the explanations thereof are omitted.

Figure 5:
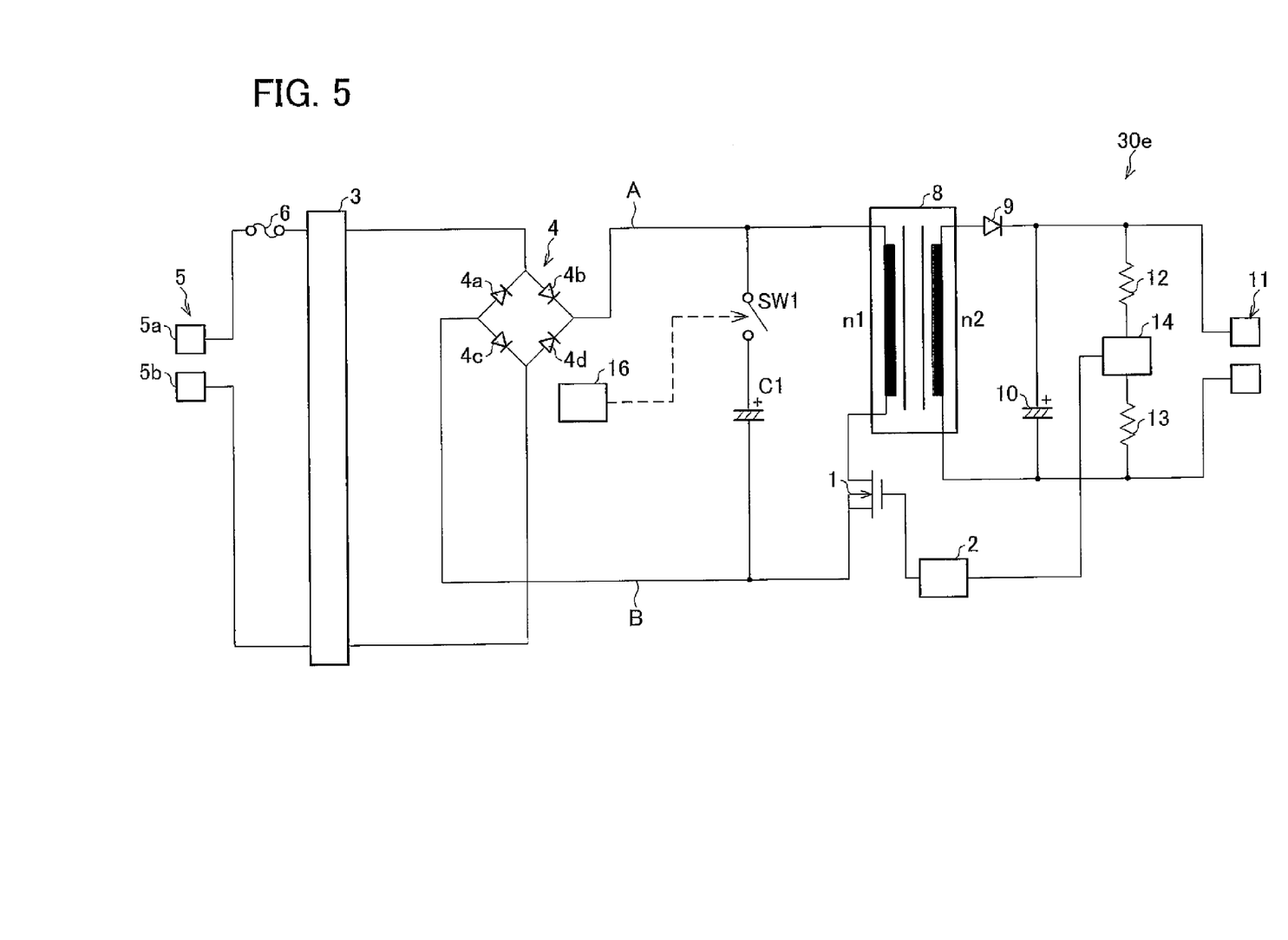
FIG. 5 is a circuit diagram of a switching power supply apparatus according to still another exemplary embodiment of the present invention.

FIG. 5 is a circuit diagram schematically illustrating a configuration of a switching power supply apparatus 30e according to the present embodiment. As illustrated in FIG. 5, the switching power supply apparatus 30e includes, in lieu of a ripple voltage detection circuit 15 in the switching power supply apparatus 30a as illustrated in the Embodiment 1, a temperature detection circuit 16 provided in the vicinity of a bridge diode 4.

The temperature detection circuit 16 detects a temperature of the bridge diode 4. The temperature detection circuit 16 is not specifically limited as long as the temperature detection circuit 16 can detect a temperature of the bridge diode 4. For example, the temperature detection circuit 16 may be a thermocouple. In this case, for example, one end of the thermocouple is provided in the vicinity of a surface of the bridge diode 4 in a manner such that the thermocouple is not in contact with the surface of the bridge diode, or the thermocouple is provided so as to be in contact with the surface of the bridge diode 4. The other end of the thermocouple is connected to the temperature detection circuit 16. A temperature on the surface of a package of the bridge diode 4 may be measured with the configuration. Alternatively, the temperature detection circuit 16 may be a temperature detection circuit using a thermistor. In this case, for example, the thermistor may be provided in the vicinity of a surface of the bridge diode 4 in a manner such that the thermistor is not in contact with the surface of the bridge diode or the thermistor is provided so as to be in contact with the surface of the bridge diode. Moreover, the thermistor is connected to the temperature detection circuit 16. With this configuration, a temperature on the surface of the package of the bridge diode 4 may be measured.

The temperature detection circuit 16 monitors a result of the detection of the temperature of the bridge diode 4. When the temperature detected reaches a predetermined value or more, the temperature detection circuit 16 outputs a control signal to a switching element SW1 in order to turn off the switching element SW1. That is, when the input smoothing capacitor C1 is half short-circuited, leak current flowing into the input smoothing capacitor C1 increases. As a result, a current flowing in the bridge diode 4 provided in a preceding stage with respect to the input smoothing capacitor C1 increases and the temperature of the bridge diode 4 rises. The temperature detection circuit 16 detects the occurrence of the half short circuit of the input smoothing capacitor C1 by detecting that the temperature of the bridge diode 4 rises to a predetermined value or more. Then, the temperature detection circuit 16 switches the state of the switching element SW1 to the off state. As in the Embodiment 1, this makes it possible to prevent the occurrence of an unsafe state due to the increase in leak current by shutting off current supply to the input smoothing capacitor C1 that is half short-circuited.

The present embodiment explains a configuration in which the occurrence of a half short circuit of the input smoothing capacitor C1 is detected by detecting the temperature of the bridge diode 4. The present invention is not limited to this. For example, the present invention may have a configuration in which, for example, the occurrence of a half short circuit of the input smoothing capacitor C1 is detected by detecting a temperature of a member connected in series with respect to the input smoothing capacitor C1 or a member connected in series with respect to a parallel circuit composed of the input smoothing capacitor C1 and a primary coil n1.

The present embodiment explains a configuration including the temperature detection circuit 16 in lieu of the ripple voltage detection circuit 15 in the switching power supply apparatus 30a according to the Embodiment 1. However, the present invention is not limited to this. For example, a switching power supply apparatus as described in any one of the Embodiments 2 through 4 may include the temperature detection circuit 16 in lieu of the ripple voltage detection circuit 15. Such a case also can provide substantially the same effect as in each of the Embodiments 2 through 4.

Embodiment 6

A still another exemplary embodiment of the present invention is explained below. For convenience of an explanation, members given the same reference numerals as the members as in the Embodiment 1 respectively have identical functions, and the explanations thereof are omitted.

Figure 6:
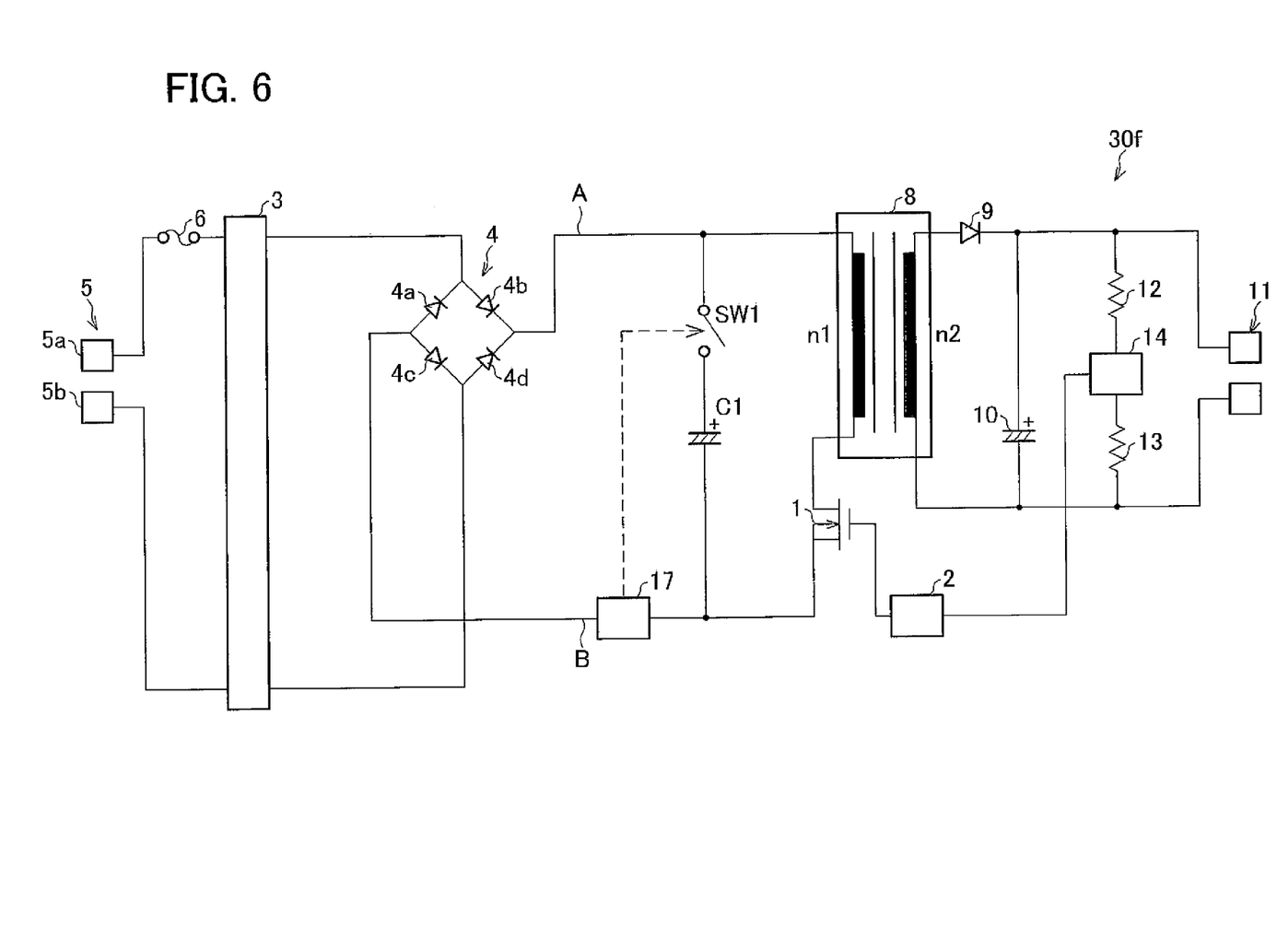
FIG. 6 is a circuit diagram of a switching power supply apparatus according to still another exemplary embodiment of the present invention.

FIG. 6 is a circuit diagram schematically illustrating a configuration of a switching power supply apparatus 30f according to the present embodiment. As illustrated in FIG. 6, the switching power supply apparatus 30f includes, in lieu of a ripple voltage detection circuit 15 in a switching power supply apparatus 30a as illustrated in the Embodiment 1, a current detection circuit 17 connected in series with a low-level power supply line B. More specifically, the current detection circuit 17 is connected in series between (a) a node of an input smoothing capacitor C1 and a power supply line B and (b) a bridge diode 4.

The current detection circuit 17 detects a current flowing in the power supply line B. When a current of a predetermined amount or more flows in the power supply line B, the current detection circuit 17 generates a control signal for turning off a switching element SW1 and outputs the control signal to the switching element SW1. In other words, when the input smoothing capacitor C1 is half short-circuited, leak current flowing in the input smoothing capacitor C1 increases. Consequently, a current flowing in the power supply line B increases. The current detection circuit 17 detects the occurrence of a half short circuit of the input smoothing capacitor C1 by detecting a current of a predetermined amount or more in the power supply line B, and switches a state of the switching element SW1 to an off state. This makes it possible to prevent the occurrence of an unsafe state caused by the increase in leak current by shutting off current supply to the input smoothing capacitor C1 that is half-short circuited.

The current detection circuit 17 includes a resistor of a micro resistance value connected in series with respect to the power supply line B and detects a dropout voltage between the ends of this resistor. By detecting that the dropout voltage reaches a preset threshold (for example, a voltage twice as much as a voltage during a rated operation) or more, the current detection circuit 17 detects that the input smoothing capacitor C1 is half short-circuited. However, a configuration of the current detection circuit 17 is not limited to this, but may be any configuration as long as the current detection circuit 17 can detect whether or not a current flowing in the power supply line B is a predetermined amount or more.

Moreover, according to a configuration explained in the present embodiment, the occurrence of a half short circuit of the input smoothing capacitor C1 is detected by detecting that a current flowing in the power supply line B reaches a predetermined value or more. However, the present invention is not limited to this. For example, the present invention may have a configuration in which the current detection circuit 17 detects that the leak current of the input smoothing capacitor C1 becomes equal to or more than a predetermined value by detecting that, for example, a value of a current flowing in the input smoothing capacitor C1 or a current flowing in the parallel circuit composed of the input smoothing capacitor C1 and a primary coil n1 increases to a predetermined value or more.

Further, the present embodiment explains a configuration including the current detection circuit 17 in lieu of the ripple voltage detection circuit 15 in the switching power supply apparatus 30a according to the Embodiment 1. However, the present invention is not limited to this. For example, a switching power supply apparatus as described in any one of the Embodiments 2 through 4 may include the current detection circuit 17 in lieu of the ripple voltage detection circuit 15. Such a case also can provide substantially the same effect as in each of the Embodiments 2 through 4.

Each of the embodiments as explained above explains a case using a switching power supply apparatus (AC-DC converter) that converts an input commercial AC voltage to a DC voltage. However, the present invention is not limited to this. The present invention is also applicable in a switching power supply apparatus (DC-DC converter) that outputs a DC voltage obtained by converting an input DC voltage to a different DC voltage level. In this case, the switching power supply apparatus may have a configuration, for example, in which: a bridge diode 4 and a filter circuit 3 are omitted; one end of the fuse 6 is connected to the first terminal 5a of the input section 5 and the other end of the fuse 6 is connected to the power source line A; and the second terminal 5b of the input section 5 is connected to the power source line B.

Furthermore, in the embodiments explained above, in a case where it is not necessary to remove noise components, the filter circuit 3 may be omitted.

Summary of Embodiments

As illustrated in the Embodiments, each of the switching power supply apparatuses 30a, 30b, 30c, 30c, and 30f includes: a transformer 8 including a primary coil n1 and a secondary coil n2; an input smoothing capacitor C1 that is connected in parallel to the primary coil n1 and smoothes a DC voltage to be inputted into the primary coil n1; a main switching element 1 causing, by switching the DC voltage, the DC voltage to be outputted to the secondary coil n2 as a pulse; a diode 9 that smoothes and outputs the pulse; an output smoothing capacitor 10; an output terminal 11; a control circuit 2 for controlling a switching operation of the main switching element 1 so that an output voltage from the output terminal 11 becomes constant; voltage divider resistances 12 and 13; a comparator circuit 14; a ripple voltage detection circuit 15, temperature detection circuit 16, or current detection circuit 17 for detecting that leak current of the input smoothing capacitor C1 becomes equal to or more than a predetermined value; and a switching element SW1 connected in series with respect to the input smoothing capacitor C1, the switching means SW1 being in an on state during a normal operation, whereas the switching means SW1 goes into an off state when the ripple voltage detection circuit 15, temperature detection circuit 16, or current detection circuit 17 detects that the leak current of the input smoothing capacitor C1 becomes equal to or more than the predetermined value.

According to the arrangement, each of the switching power supply apparatuses 30a, 30b, 30c, 30c, and 30f includes the ripple voltage detection circuit 15, temperature detection circuit 16, or current detection circuit 17 that detects that the leak current of the input smoothing capacitor C1 becomes equal to or more than the predetermined value, and the switching element SW1 connected in series with respect to the input smoothing capacitor C1. The switching element SW1 is in the on state during a normal operation (when a value of the leak current is less than the predetermined value). Accordingly, a voltage is applied to the input smoothing capacitor C1, and the input smoothing capacitor C1 can smooth the voltage applied. Meanwhile, when the ripple voltage detection circuit 15, temperature detection circuit 16, or current detection circuit 17 detects that the leak current of the input smoothing capacitor C1 becomes equal to or more than the predetermined value, the switching element SW1 is turned off. This shuts off the voltage to be applied to the input smoothing capacitor C1 and properly prevents, with a simple circuit configuration, the switching power supply apparatus from going into an unstable state due to the leak current of the input smoothing capacitor C1.

In addition to the arrangement mentioned above, any one of the switching power supply apparatuses 30a, 30b, 30c, 30e, and 30f, may further include: an input section 5 including a first terminal 5a and a second terminal 5b and being connected to a voltage supply source; a fuse 6 connected to the first terminal 5a; and a switching element SW2 connected in parallel with respect to the input smoothing capacitor C1, the switching element SW2 being in an off state during a normal operation, whereas the switching element SW2 goes into an on state when the ripple voltage detection circuit 15 detects that the leak current of the input smoothing capacitor C1 becomes equal to or more than the predetermined value.

According to the arrangement, any one of the switching power supply apparatuses 30a, 30b, 30c, 30e, and 30f further includes: the input terminal 5 that has the first terminal 5a and the second terminal 5b and is connected to the voltage power source; and the fuse 6 connected between (a) a node of the input smoothing capacitor C1 and the primary coil n1 and (b) the first terminal 5a; and the switching element SW2 connected in parallel to the input smoothing capacitor C1. The switching element SW2 is turned off during a normal operation. Accordingly, the switching element SW2 does not contribute to the switching operation of the switching power supply apparatus. Meanwhile, when the ripple voltage detection circuit 15 detects that the leak current of the input smoothing capacitor C1 becomes equal to or more than the predetermined value, the switching element SW2 becomes an on state. This causes a current to flow into the fuse 6 via the switching element SW2 and increases a current flowing in the fuse 6. Therefore, it becomes possible to shut off the current flowing in the switching power supply apparatus by causing the fuse 6 to quickly operate. This makes it possible to properly prevent, with a simple circuit configuration, the switching power supply apparatus from going into an unstable state due to the leak current of the input smoothing capacitor C1.

A switching power supply apparatus 33d includes: an input section 5 including a first terminal 5a and a second terminal 5b and being connected to a voltage supply source; a fuse 6 connected to the first terminal 5a; a transformer 8 including a primary coil n1 and a secondary coil n2; an input smoothing capacitor C1 that is connected in parallel to the primary coil n1 and smoothes a DC voltage to be inputted into the primary coil n1; a main switching element 1 causing, by switching the DC voltage, the DC voltage to be outputted to the secondary coil n2 as a pulse; a diode 9 that smoothes and outputs the pulse; an output smoothing capacitor 10; an output terminal 11; a control circuit 2 for controlling a switching operation of the main switching element 1 so that an output voltage from the output terminal 11 becomes constant; voltage divider resistors 12 and 13; a comparator circuit 14; a ripple voltage detection circuit 15 for detecting that leak current of the input smoothing capacitor C1 becomes equal to or more than a predetermined value; and a switching element SW4 connected in parallel with respect to the input smoothing capacitor C1, the switching element SW4 being in an off state during a normal operation, whereas the switching element SW4 goes into an on state when the detection means detects that the leak current of the input smoothing capacitor C1 becomes equal to or more than the predetermined value.

According to the arrangement, the switching power supply apparatus 30d further includes: the input terminal 5 that has the first terminal 5a and the second terminal 5b and is connected to the voltage power source; the fuse 6 connected between (a) a node of the input smoothing capacitor C1 and the primary coil n1 and (b) the first terminal 5a; and the switching element SW4 connected in series to the input smoothing capacitor C11. The switching element SW4 is turned off during a normal operation. Accordingly, the switching element SW4 does not contribute to the switching operation of the switching power supply apparatus. Meanwhile, when the ripple voltage detection circuit 15 detects that the leak current of the input smoothing capacitor C1 becomes equal to or more than the predetermined value, the switching element SW4 becomes an on state. This causes a current to flow into the fuse 6 via the switching element SW4 and increases a current flowing in the fuse 6. Therefore, it becomes possible to shut off the current flowing in the switching power supply apparatus by causing the fuse 6 to quickly operate. This makes it possible to properly prevent, with a simple circuit configuration, the switching power supply apparatus from going into an unstable state due to the leak current of the input smoothing capacitor C1.

In the switching power supply apparatus: a parallel circuit composed of the switching element SW2 and the main switching element 1 may be connected in parallel to the input smoothing capacitor C1.

According to the arrangement, the parallel circuit composed of the switching element SW2 and the main switching element 1 are connected in parallel to the input smoothing capacitor C1. Therefore, when the ripple voltage detection circuit 15, temperature detection circuit 16, or current detection circuit 17 detects that the leak current of the input smoothing capacitor C1 becomes equal to or more than the predetermined value, the switching element SW2 becomes an on state. This causes a short circuit between terminals of the main switching element 1 and increases a current flowing into the fuse 6. Therefore, it becomes possible to shut off the current flowing in the switching power supply apparatus by causing the fuse 6 to quickly operate. This makes it possible to properly prevent, with a simple circuit configuration, the switching power supply apparatus from going into an unstable state due to the leak current of the input smoothing capacitor C1.

In the switching power supply apparatus: a parallel circuit composed of the switching element SW4 and the input smoothing capacitor C1 may be connected in parallel to the primary coil n1.

According to the arrangement, the parallel circuit composed of the switching element SW4 and the input smoothing capacitor C1 are connected in parallel with respect to the primary coil n1. When the ripple voltage detection circuit 15 detects that the leak current of the input smoothing capacitor C1 becomes equal to or more than the predetermined value, the switching element SW4 becomes an on state. This causes a short circuit between end terminals of the input smoothing capacitor C1 and increases a current flowing into the fuse 6. Therefore, it becomes possible to shut off the current flowing in the switching power supply apparatus by causing the fuse 6 to quickly operate. This makes it possible to properly prevent, with a simple circuit configuration, the switching power supply apparatus from going into an unstable state due to the leak current of the input smoothing capacitor C1.

Any one of the switching power supply apparatuses mentioned above further includes: an input section 5 including a first terminal 5a and a second terminal 5b and being connected to an AC voltage supply source; a fuse 6 connected to the first terminal 5a; a filter circuit 3 connected to the fuse 6 and the second terminal 5b; a bridge diode 4 for rectifying an AC voltage inputted into the input section 5; and a switching element SW3 connected in parallel to the filter circuit 3, the switching element SW3 being in an off state during a normal operation, whereas the switching element SW3 goes into an on state when the ripple voltage detection circuit 15, temperature detection circuit 16, or current detection circuit 17 detects that the leak current of the input smoothing capacitor C1 becomes equal to or more than the predetermined value.

According to the arrangement, the switching power supply apparatus mentioned above further includes: the input terminal 5 that has the first terminal 5a and the second terminal 5b and is connected to the AC voltage power source; the fuse 6 connected to the first terminal 5a; the filter circuit 3 connected to the fuse 6 and the second terminal 5b; the bridge diode 4 for rectifying the AC voltage inputted into the input terminal 5; and the switching element SW3 connected in parallel to the filter circuit 3. The switching element SW3 is turned off during a normal operation. Accordingly, the switching element SW3 does not contribute to the switching operation of the switching power supply apparatus. Meanwhile, when the ripple voltage detection circuit 15, temperature detection circuit 16, or current detection circuit 17 detects that the leak current of the input smoothing capacitor C1 becomes equal to or more than the predetermined value, the switching element SW3 becomes the on state. This causes a current to flow into the filter circuit via the switching element SW3 and the filter circuit 3 is short-circuited. This increases a current flowing in the fuse 6. Therefore, it becomes possible to shut off the current flowing into the switching power supply apparatus by causing the fuse 6 to quickly operate. This makes it possible to properly prevent, with a simple circuit configuration, the switching power supply apparatus from going into an unstable state due to the leak current of the input smoothing capacitor C1.

A switching power supply apparatus 30c includes: an input section 5 including a first terminal 5a and a second terminal 5b and being connected to an AC voltage supply source; a fuse 6 connected to the first terminal 5a; a filter circuit 3 connected to the fuse 6 and the second terminal 5b; a bridge diode 4 for rectifying an AC voltage inputted into the input section 5; a transformer 8 including a primary coil n1 and a secondary coil n2; an input smoothing capacitor C1 that is connected in parallel to the primary coil n1 and smoothes a DC voltage to be inputted into the primary coil n1; a main switching element 1 causing, by switching the DC voltage, the DC voltage to be outputted to the secondary coil n2 as a pulse; a diode 9 that smoothes and outputs the pulse; an output smoothing capacitor 10; an output terminal 11; a control circuit 2 for controlling a switching operation of the main switching element 1 so that an output voltage from the output terminal 11 becomes constant; voltage divider resistors 12 and 13; a comparator circuit 14; a ripple voltage detection circuit 15 for detecting that leak current of the input smoothing capacitor C1 becomes equal to or more than a predetermined value; and a switching element SW3 connected in parallel to the filter circuit 3, the switching element SW3 being in an off state during a normal operation, whereas the switching element SW3 goes into an on state when the ripple voltage detection circuit 15 detects that the leak current of the input smoothing capacitor C1 becomes equal to or more than the predetermined value.

According to the arrangement, the switching power supply apparatus mentioned above further includes: the input terminal 5 that has the first terminal 5a and the second terminal 5b and is connected to the AC voltage power source; the fuse 6 connected to the first terminal 5a; the filter circuit 3 connected to the fuse 6 and the second terminal 5b; the bridge diode 4 for rectifying the AC voltage inputted into the input terminal 5; and the switching element SW3 connected in parallel to the filter circuit 3. The switching element SW3 is turned off during a normal operation. Accordingly, the switching element SW3 does not contribute to the switching operation of the switching power supply apparatus. Meanwhile, when the ripple voltage detection circuit 15 detects that the leak current of the input smoothing capacitor C1 becomes equal to or more than the predetermined value, the switching element SW3 becomes the on state. This causes a current to flow into the filter circuit 3 via the switching element SW3 and the filter circuit 3 is short-circuited. This increases a current flowing in the fuse 6. Therefore, it becomes possible to shut off the current flowing in the switching power supply apparatus by causing the fuse 6 to quickly operate. This makes it possible to properly prevent, with a simple circuit configuration, the switching power supply apparatus from going into an unstable state due to the leak current of the input smoothing capacitor C1.

In any one of the switching power supply apparatuses as mentioned above: the ripple voltage detection circuit 15 detects that the leak current of the input smoothing capacitor C1 becomes equal to or more than the predetermined value by detecting that a value of voltage applied to the input smoothing capacitor C1 or a range in which the value of voltage applied to the input smoothing capacitor C1 varies becomes equal to or more than a predetermined value.

When the leak current of the input smoothing capacitor C1 increases, a ripple voltage (an AC component in the DC voltage output) occurs in the input smoothing capacitor C1. According to the arrangement, the ripple voltage detection circuit 15 detects that the ripple voltage occurs by detecting that a value of voltage applied to the input smoothing capacitor C1 or a range in which the value of voltage applied to the input smoothing capacitor C1 varies becomes equal to or more than a predetermined value. As a result, the ripple detection circuit 15 can indirectly detect that the leak current of the input smoothing capacitor C1 becomes equal to or more than the predetermined value.

In any one of the switching power supply apparatuses as mentioned above: the current detection circuit 17 detects that the leak current of the input smoothing capacitor C1 becomes equal to or more than the predetermined value by detecting that a value of current flowing in the input smoothing capacitor C1 or a value of current flowing in a parallel circuit composed of the input smoothing capacitor C1 and the primary coil n1 becomes equal to or more than a predetermined value.

When the leak current of the input smoothing capacitor C1 increases, a current flowing into the input smoothing capacitor C1 and a current flowing into a parallel circuit composed of the input smoothing capacitor C1 and the primary coil n1 increases. According to the arrangement, by detecting that the current flowing in the input smoothing capacitor C1 becomes equal to or more than a predetermined value, the current detection circuit 17 can directly detect that the leak current of the input smoothing capacitor C1 becomes equal to or more than the predetermined value. Alternatively, by detecting that a value of current flowing in the parallel circuit composed of the input smoothing capacitor C1 and the primary coil n1, the current detection circuit 17 can indirectly detect that the leak current of the input smoothing capacitor C1 becomes equal to or more than the predetermined value.

In any one of the switching power supply apparatuses as mentioned above: the temperature detection circuit 16 detects that the leak current of the input smoothing capacitor C1 becomes equal to or more than the predetermined value by detecting that a temperature of a member on a side provided with the primary coil n1 of the transformer 8 rises to a temperature equal to or more than a predetermined value.

When the leak current of the input smoothing capacitor C1 increases, a current flowing into the member connected in series to the input smoothing capacitor C1 and a current flowing in the member connected in series with respect to the parallel circuit composed of the input smoothing capacitor C1 and the primary coil n1 increases. Accordingly, temperatures of the members become higher than those during the normal operation, respectively. According to the arrangement, by detecting that the temperature of the member connected in series to the input smoothing capacitor C1 or the member connected in series with respect to the parallel circuit composed of the input smoothing capacitor C1 and the primary coil n1 rises to a temperature equal to or more than a predetermined value, the temperature detection circuit 16 can indirectly detect that the leak current of the input smoothing capacitor C1 becomes equal to or more than the predetermined value.

For example, the switching power supply apparatus as mentioned above may further include: an input section 5 connected to an AC voltage supply source; and a bridge diode 4 for rectifying an AC voltage inputted into the input section 5, the temperature detection circuit 16 detecting that the leak current of the input smoothing capacitor C1 becomes equal to or more than the predetermined value by detecting that a temperature of the bridge diode 4 rises to a temperature equal to or more than a predetermined value.

The bridge diode 4 is easily heated by an increase in a current flowing in the bridge diode 4. Therefore, by detecting that the temperature of the bridge diode 4 rises to a temperature equal to a predetermined value or more, it becomes possible to properly detect that the leak current of the input smoothing capacitor C1 becomes a predetermined value or more.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A switching power supply apparatus comprising:
   a transformer including a primary coil and a secondary coil;
   an input smoothing capacitor that is connected in parallel to the primary coil and smoothes a DC voltage to be inputted into the primary coil;
   main switching means causing, by switching the DC voltage, the DC voltage to be outputted to the secondary coil as a pulse;
   output means that smoothes and outputs the pulse;
   control means for controlling a switching operation of the main switching means so that an output voltage from the output means becomes constant;
   detection means for detecting that leak current of the input smoothing capacitor becomes equal to or more than a predetermined value; and
   first auxiliary switching means connected in series with respect to the input smoothing capacitor,
   the first auxiliary switching means being in an on state during a normal operation, whereas the first auxiliary switching means goes into an off state when the detection means detects that the leak current of the input smoothing capacitor becomes equal to or more than the predetermined value.

2. The switching power supply apparatus as set forth in claim 1, further comprising:
   an input section including a first terminal and a second terminal and being connected to a voltage supply source;
   overcurrent shutting off means connected to the first terminal; and
   second auxiliary switching means connected in parallel with respect to the input smoothing capacitor,
   the second auxiliary switching means being in an off state during a normal operation, whereas the second auxiliary switching means goes into an on state when the detection means detects that the leak current of the input smoothing capacitor becomes equal to or more than the predetermined value.

3. The switching power supply apparatus as set forth in claim 2, wherein:
a parallel circuit composed of the second auxiliary switching means and the main switching means is connected in parallel to the input smoothing capacitor.

4. The switching power supply apparatus as set forth in claim 2, further comprising:
an input section including a first terminal and a second terminal and being connected to an AC voltage supply source;
overcurrent shutting off means connected to the first terminal;
filter means connected to the overcurrent shutting off means and the second terminal;
rectifying means for rectifying an AC voltage inputted into the input section; and
third auxiliary switching means connected in parallel to the filter means,
the third auxiliary switching means being in an off state during a normal operation, whereas the third auxiliary switching means goes into an on state when the detection means detects that the leak current of the input smoothing capacitor becomes equal to or more than the predetermined value.

5. The switching power supply apparatus as set forth in claim 1, further comprising:
an input section including a first terminal and a second terminal and being connected to an AC voltage supply source;
overcurrent shutting off means connected to the first terminal;
filter means connected to the overcurrent shutting off means and the second terminal;
rectifying means for rectifying an AC voltage inputted into the input section; and
third auxiliary switching means connected in parallel to the filter means,
the third auxiliary switching means being in an off state during a normal operation, whereas the third auxiliary switching means goes into an on state when the detection means detects that the leak current of the input smoothing capacitor becomes equal to or more than the predetermined value.

6. The switching power supply apparatus as set forth in claim 5, wherein:
the detection means detects that the leak current of the input smoothing capacitor becomes equal to or more than the predetermined value by detecting that a value of voltage applied to the input smoothing capacitor or a range in which the value of voltage applied to the input smoothing capacitor varies becomes equal to or more than a predetermined value.

7. The switching power supply apparatus as set forth in claim 5, wherein:
the detection means detects that the leak current of the input smoothing capacitor becomes equal to or more than the predetermined value by detecting that a value of current flowing in the input smoothing capacitor or a value of current flowing in a parallel circuit composed of the input smoothing capacitor and the primary coil becomes equal to or more than a predetermined value.

8. The switching power supply apparatus as set forth in claim 5, wherein:
the detection means detects that the leak current of the input smoothing capacitor becomes equal to or more than the predetermined value by detecting that a temperature of a member connected in series to the input smoothing capacitor or a member connected in series to a parallel circuit composed of the input smoothing capacitor and the primary coil rises to a temperature equal to or more than a predetermined value.

9. The switching power supply apparatus as set forth in claim 8, further comprising:
an input section connected to an AC voltage supply source; and
rectifying means for rectifying an AC voltage inputted into the input section,
the detection means detecting that the leak current of the input smoothing capacitor becomes equal to or more than the predetermined value by detecting that a temperature of the rectifying means rises to a temperature equal to or more than a predetermined value.

10. The switching power supply apparatus as set forth in claim 1, wherein:
the detection means detects that the leak current of the input smoothing capacitor becomes equal to or more than the predetermined value by detecting that a value of voltage applied to the input smoothing capacitor or a range in which the value of voltage applied to the input smoothing capacitor varies becomes equal to or more than a predetermined value.

11. The switching power supply apparatus as set forth in claim 1, wherein:
the detection means detects that the leak current of the input smoothing capacitor becomes equal to or more than the predetermined value by detecting that a value of current flowing in the input smoothing capacitor or a value of current flowing in a parallel circuit composed of the input smoothing capacitor and the primary coil becomes equal to or more than a predetermined value.

12. The switching power supply apparatus as set forth in claim 1, wherein:
the detection means detects that the leak current of the input smoothing capacitor becomes equal to or more than the predetermined value by detecting that a temperature of a member connected in series to the input smoothing capacitor or a member connected in series to a parallel circuit composed of the input smoothing capacitor and the primary coil rises to a temperature equal to or more than a predetermined value.

13. The switching power supply apparatus as set forth in claim 12, further comprising:
an input section connected to an AC voltage supply source; and
rectifying means for rectifying an AC voltage inputted into the input section,
the detection means detecting that the leak current of the input smoothing capacitor becomes equal to or more than the predetermined value by detecting that a temperature of the rectifying means rises to a temperature equal to or more than a predetermined value.

14. A switching power supply apparatus comprising:
an input section including a first terminal and a second terminal and being connected to a voltage supply source;
overcurrent shutting off means connected to the first terminal;
a transformer including a primary coil and a secondary coil;
an input smoothing capacitor that is connected in parallel to the primary coil and smoothes a DC voltage to be inputted into the primary coil;
main switching means causing, by switching the DC voltage, the DC voltage to be outputted to the secondary coil as a pulse;

output means that smoothes and outputs the pulse;

control means for controlling a switching operation of the main switching means so that an output voltage from the output means becomes constant;

detection means for detecting that leak current of the input smoothing capacitor becomes equal to or more than a predetermined value; and second auxiliary switching means connected in parallel with respect to the input smoothing capacitor, the second auxiliary switching means being in an off state during a normal operation, whereas the second auxiliary switching means goes into an on state when the detection means detects that the leak current of the input smoothing capacitor becomes equal to or more than the predetermined value.

15. The switching power supply apparatus as set forth in claim 14, wherein:

a parallel circuit composed of the second auxiliary switching means and the main switching means is connected in parallel to the input smoothing capacitor.

16. The switching power supply apparatus as set forth in claim 14, wherein:

a parallel circuit composed of the second auxiliary switching means and the input smoothing capacitor is connected in parallel to the primary coil.

17. The switching power supply apparatus as set forth in claim 14, further comprising:

an input section including a first terminal and a second terminal and being connected to an AC voltage supply source;

overcurrent shutting off means connected to the first terminal;

filter means connected to the overcurrent shutting off means and the second terminal;

rectifying means for rectifying an AC voltage inputted into the input section; and third auxiliary switching means connected in parallel to the filter means, the third auxiliary switching means being in an off state during a normal operation, whereas the third auxiliary switching means goes into an on state when the detection means detects that the leak current of the input smoothing capacitor becomes equal to or more than the predetermined value.

18. The switching power supply apparatus as set forth in claim 14, wherein:

the detection means detects that the leak current of the input smoothing capacitor becomes equal to or more than the predetermined value by detecting that a value of voltage applied to the input smoothing capacitor or a range in which the value of voltage applied to the input smoothing capacitor varies becomes equal to or more than a predetermined value.

19. The switching power supply apparatus as set forth in claim 14, wherein:

the detection means detects that the leak current of the input smoothing capacitor becomes equal to or more than the predetermined value by detecting that a value of current flowing in the input smoothing capacitor or a value of current flowing in a parallel circuit composed of the input smoothing capacitor and the primary coil becomes equal to or more than a predetermined value.

20. The switching power supply apparatus as set forth in claim 14, wherein:

the detection means detects that the leak current of the input smoothing capacitor becomes equal to or more than the predetermined value by detecting that a temperature of a member connected in series to the input smoothing capacitor or a member connected in series to a parallel circuit composed of the input smoothing capacitor and the primary coil rises to a temperature equal to or more than a predetermined value.

21. The switching power supply apparatus as set forth in claim 20, further comprising:

an input section connected to an AC voltage supply source; and rectifying means for rectifying an AC voltage inputted into the input section, the detection means detecting that the leak current of the input smoothing capacitor becomes equal to or more than the predetermined value by detecting that a temperature of the rectifying means rises to a temperature equal to or more than a predetermined value.

22. A switching power supply apparatus comprising:

an input section including a first terminal and a second terminal and being connected to an AC voltage supply source;

overcurrent shutting off means connected to the first terminal;

filter means connected to the overcurrent shutting off means and the second terminal;

rectifying means for rectifying an AC voltage inputted into the input section;

a transformer including a primary coil and a secondary coil;

an input smoothing capacitor that is connected in parallel to the primary coil and smoothes a DC voltage to be inputted into the primary coil;

main switching means causing, by switching the DC voltage, the DC voltage to be outputted to the secondary coil as a pulse;

output means that smoothes and outputs the pulse;

control means for controlling a switching operation of the main switching means so that an output voltage from the output means becomes constant;

detection means for detecting that leak current of the input smoothing capacitor becomes equal to or more than a predetermined value; and third auxiliary switching means connected in parallel to the filter means, the third auxiliary switching means being in an off state during a normal operation, whereas the third auxiliary switching means goes into an on state when the detection means detects that the leak current of the input smoothing capacitor becomes equal to or more than the predetermined value.

* * * * *